United States Patent
Nagatani

(10) Patent No.: US 10,351,021 B2
(45) Date of Patent: Jul. 16, 2019

(54) VEHICLE SEAT FASTENING STRUCTURE AND VEHICLE SEAT FASTENER

(71) Applicant: TOYOTA BOSHOKU KABUSHIKI KAISHA, Aichi (JP)

(72) Inventor: Yuki Nagatani, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/957,140

(22) Filed: Apr. 19, 2018

(65) Prior Publication Data

US 2018/0334058 A1 Nov. 22, 2018

(30) Foreign Application Priority Data

May 22, 2017 (JP) .................. 2017-100872

(51) Int. Cl.
*B60N 2/42* (2006.01)
*B60N 2/427* (2006.01)
*B60N 2/07* (2006.01)
*B60N 2/00* (2006.01)
*B60N 2/16* (2006.01)

(52) U.S. Cl.
CPC ........... *B60N 2/0732* (2013.01); *B60N 2/002* (2013.01); *B60N 2/0705* (2013.01); *B60N 2/0715* (2013.01); *B60N 2/0722* (2013.01); *B60N 2/1615* (2013.01); *B60N 2/427* (2013.01); *B60N 2/42736* (2013.01)

(58) Field of Classification Search
CPC .... B60N 2/002; B60N 2/0705; B60N 2/0715; B60N 2/0722; B60N 2/1615; B60N 2/427; B60N 2/42736

USPC .......... 297/216.1, 216.14, 216.15, 216.16, 297/216.18, 344.11, 344.15, 344.16, 297/344.17

See application file for complete search history.

(56) References Cited

U.S. PATENT DOCUMENTS 4,072,347 A * 2/1978 Boisset ............... B60N 2/0705
297/468
5,244,178 A * 9/1993 Stewart .................. B60N 2/005
248/300

(Continued)

FOREIGN PATENT DOCUMENTS

FR -3043980 A1 * 5/2017
JP 2015-214329 12/2015

*Primary Examiner* — Rodney B White
(74) *Attorney, Agent, or Firm* — Greenblum & Bernstein, P.L.C.

(57) ABSTRACT

Provided is a vehicle seat fastening structure that enables a reduced length of a bolt for fastening a movable rail and a cushion frame in a spaced-apart manner. The cushion frame includes a bottom wall extending in a seat-width direction and a seat front-rear direction. The nut includes a body having a cylindrical shape and configured to penetrate the bottom wall, a thread groove, and a flange portion projecting radially from the body. A length of the nut along a central axis thereof is greater than a separation distance between an upper surface of the movable rail and an upper surface of the bottom wall of the cushion frame in a state in which no impact is applied to the cushion frame. The flange portion is provided in an area of the nut at a distance from an insertion opening for the bolt greater than the separation distance.

6 Claims, 7 Drawing Sheets

(56) References Cited

U.S. PATENT DOCUMENTS

| | | | |
|---|---|---|---|
| 5,707,035 A * | 1/1998 | Kargol | B60N 2/0232 248/429 |
| 5,848,775 A * | 12/1998 | Isomura | B60N 2/067 248/430 |
| 8,136,619 B2 * | 3/2012 | Hwang | B60N 2/002 177/136 |
| 9,856,903 B2 * | 1/2018 | Bouchenoire | B60N 2/01558 |
| 9,994,128 B2 * | 6/2018 | Kume | B60N 2/0705 |
| 2003/0111276 A1 | 6/2003 | Kajiyama | B60N 2/002 177/144 |
| 2004/0035224 A1 * | 2/2004 | Kajiyama | B60N 2/002 73/862.474 |
| 2005/0061643 A1 * | 3/2005 | Rainey | B60N 2/002 200/85 A |
| 2006/0010984 A1 * | 1/2006 | Yamazaki | B60N 2/002 73/761 |
| 2006/0107767 A1 * | 5/2006 | Kawabata | B60N 2/002 73/862.627 |
| 2006/0180359 A1 * | 8/2006 | Wolfe | G01G 19/4142 177/144 |
| 2007/0290116 A1 * | 12/2007 | Lambert | B60N 2/07 248/429 |
| 2008/0098822 A1 * | 5/2008 | Sakamoto | B60N 2/002 73/781 |
| 2008/0098823 A1 * | 5/2008 | Sumi | B60N 2/002 73/781 |
| 2008/0127752 A1 * | 6/2008 | Nakano | B60N 2/002 73/862.627 |
| 2008/0134797 A1 * | 6/2008 | Nakano | B60N 2/002 73/781 |
| 2008/0156103 A1 * | 7/2008 | Nakano | B60N 2/002 73/781 |
| 2009/0000846 A1 * | 1/2009 | Nemec | B60K 28/04 180/273 |
| 2009/0064792 A1 * | 3/2009 | Kawabata | B60N 2/002 73/781 |
| 2010/0038150 A1 * | 2/2010 | Hwang | B60N 2/002 177/136 |
| 2011/0000719 A1 * | 1/2011 | Takayasu | B60N 2/002 177/136 |
| 2011/0209924 A1 * | 9/2011 | Endo | B60N 2/002 177/136 |
| 2012/0006601 A1 * | 1/2012 | Endo | B60N 2/002 177/136 |
| 2012/0181826 A1 * | 7/2012 | Sosnowski | B60N 2/002 297/217.1 |
| 2013/0025377 A1 * | 1/2013 | Ozawa | B60N 2/002 73/862.621 |
| 2013/0341484 A1 * | 12/2013 | Yamada | B60N 2/682 248/636 |
| 2014/0224041 A1 * | 8/2014 | Ozawa | B60N 2/002 73/862.381 |
| 2014/0224553 A1 * | 8/2014 | Ozawa | B60N 2/002 177/136 |
| 2014/0338989 A1 * | 11/2014 | Aoyama | G01G 19/08 177/136 |
| 2014/0338990 A1 * | 11/2014 | Aoyama | G01G 19/08 177/136 |
| 2015/0129737 A1 * | 5/2015 | Oya | B60N 2/0722 248/429 |
| 2015/0307006 A1 | 10/2015 | Hayashi | |
| 2016/0313196 A1 * | 10/2016 | Seo | G01L 1/26 |
| 2018/0001791 A1 * | 1/2018 | Kume | B60N 2/0705 |
| 2018/0215289 A1 * | 8/2018 | Sato | B60N 2/0705 |

* cited by examiner

VEHICLE SEAT FASTENING STRUCTURE AND VEHICLE SEAT FASTENER

CROSS-REFERENCE TO RELATED APPLICATIONS

This application claims the benefit of Japanese Patent Application No. 2017-100872 filed on May 22, 2017 with the Japan Patent Office, the entire disclosure of which is incorporated herein by reference.

BACKGROUND

The present disclosure relates to a vehicle seat fastening structure.

For example, in a vehicle seat arranged in an automobile or the like, a seat cushion forming the vehicle seat is mounted to a slide rail that is slidable in a seat front-rear direction. Specifically, a cushion frame forming a framework of the seat cushion is fixed to a movable rail of the slide rail with bolts and nuts (see Japanese Unexamined Patent Application Publication No. 2015-214329).

In some types of vehicles, a load sensor to detect an occupant's weight (a so-called "Occupant Classification Sensor (OCS)") is provided between the movable rail and the cushion frame. To provide the load sensor, a specified space for arrangement of the load sensor is required between the movable rail and the cushion frame.

Also, if a collision from behind the vehicle occurs, the cushion frame is raised upward relative to the movable rail that is mounted to the vehicle body. In order to reduce an impact due to the raising of the cushion frame, it is necessary to arrange the nut provided to the cushion frame and a bottom wall portion of the cushion frame to be spaced apart from each other in an ordinary condition.

Thus, in order to provide a specific space between the movable rail and the cushion frame as well as between the nut and the cushion frame, a cylindrical spacer 105 is arranged between an upper surface 101A of a movable rail 101 and a nut 104 as shown in FIG. 7. In a fastener of FIG. 7, a bolt 103 and the nut 104 are screw-engaged with each other through the spacer 105, and thereby the movable rail 101 and a cushion frame 102 are fastened to each other.

SUMMARY

However, arrangement of the spacer between the movable rail and the nut as described above results in an increased distance from the movable rail to the nut and thus an increased length of the bolt. Accordingly, increase in cost and weight of components is inevitable.

In one aspect of the present disclosure, it is preferable to provide a vehicle seat fastening structure that enables a reduced length of a bolt for fastening a movable rail and a cushion frame in a spaced-apart manner.

One embodiment of the present disclosure is a vehicle seat fastening structure for fastening, with a bolt and a nut, a cushion frame that forms a framework of a seat cushion of a vehicle seat to a slide rail in a vertically spaced-apart manner. The slide rail comprises a fixed rail fixed to a vehicle, and a movable rail arranged vertically above the fixed rail and slidable relative to the fixed rail. The cushion frame comprises a bottom wall extending in a seat-width direction (a width direction) and in a seat front-rear direction. The nut comprises a body having a cylindrical shape and configured to penetrate the bottom wall, a thread groove provided in an inner surface of the body and allowing screw-engagement with the bolt, and a flange portion projecting radially from the body. A length of the nut along a central axis thereof is greater than a separation distance between an upper surface of the movable rail and an upper surface of the bottom wall of the cushion frame in a state in which no impact is applied to the cushion frame. The flange portion is provided in an area of the nut at a distance from an insertion opening for the bolt in the nut greater than the separation distance.

This configuration enables fastening of the movable rail and the cushion frame in a spaced-apart manner with only the bolt and the nut and without providing a spacer by using the flange portion. Also, without the need to hold a spacer by the bolt and the nut, a screw-engagement length of the bolt and the nut can be reduced. Accordingly, the bolt may have a shorter length than that of a conventional bolt; thus, reduction in cost and weight of the fastener can be achieved. Further, without the need of a spacer, the number of components for the fastener is reduced, thereby achieving increased efficiency in manufacturing a vehicle seat.

In one embodiment of the present disclosure, the body may comprise a non-threaded portion without the thread groove in a part of the inner surface along the central axis of the nut. This configuration enables easy insertion of the bolt in the non-threaded portion, thereby achieving increased work efficiency in fastening.

In one embodiment of the present disclosure, at least a part of the thread groove may be positioned closer to the insertion opening for the bolt relative to the flange portion. This configuration enables reduction in length of a part of the nut opposite to the insertion opening for the bolt relative to the flange portion. Accordingly, further reduction in cost and weight of the fastener can be achieved.

In one embodiment of the present disclosure, the non-threaded portion may be configured to provide a clearance from the bolt when the bolt is inserted in the nut. This configuration enables much easier insertion of the bolt in the non-threaded portion, thereby achieving further increased work efficiency in fastening.

In one embodiment of the present disclosure, the thread groove may be provided, in the inner surface of the body, in an area of greater than or equal to 80% of a length along the central axis of the nut. This configuration increases a screw-engagement length between the bolt and the nut, thereby achieving improved fastening strength.

Another embodiment of the present disclosure is a vehicle seat fastener that comprises a bolt and a nut configured to fasten a cushion frame that forms a framework of a seat cushion of a vehicle seat to a slide rail in a vertically spaced-apart manner. The slide rail comprises a fixed rail fixed to a vehicle and a movable rail arranged vertically above the fixed rail and slidable relative to the fixed rail.

The cushion frame comprises a bottom wall extending in a seat-width direction and in the seat front-rear direction. The nut comprises a body having a cylindrical shape and configured to penetrate the bottom wall, a thread groove provided in an inner surface of the body and allowing screw-engagement with the bolt, and a flange portion projecting radially from the body. A length of the nut along a central axis thereof is greater than a separation distance between an upper surface of the movable rail and an upper surface of the bottom wall of the cushion frame in a state in which no impact is applied to the cushion frame. The flange portion is provided in an area of the nut at a distance from an insertion opening for the bolt in the nut greater than the separation distance.

This configuration enables fastening of the movable rail and the cushion frame in a spaced-apart manner using only the bolt and the nut, without providing a spacer. Also, the bolt may have a reduced length, thereby achieving reduction in cost and weight of the fastener. Further, without the need of a spacer, the number of components for the fastener is reduced, thereby achieving increased efficiency in manufacturing a vehicle seat.

BRIEF DESCRIPTION OF THE DRAWINGS

Some embodiments of the present disclosure will be described hereinafter by way of example with reference to the accompanying drawings, in which.

DETAILED DESCRIPTION OF THE PREFERRED EMBODIMENTS

1. First Embodiment

[1-1. Configuration]

Figure 1:
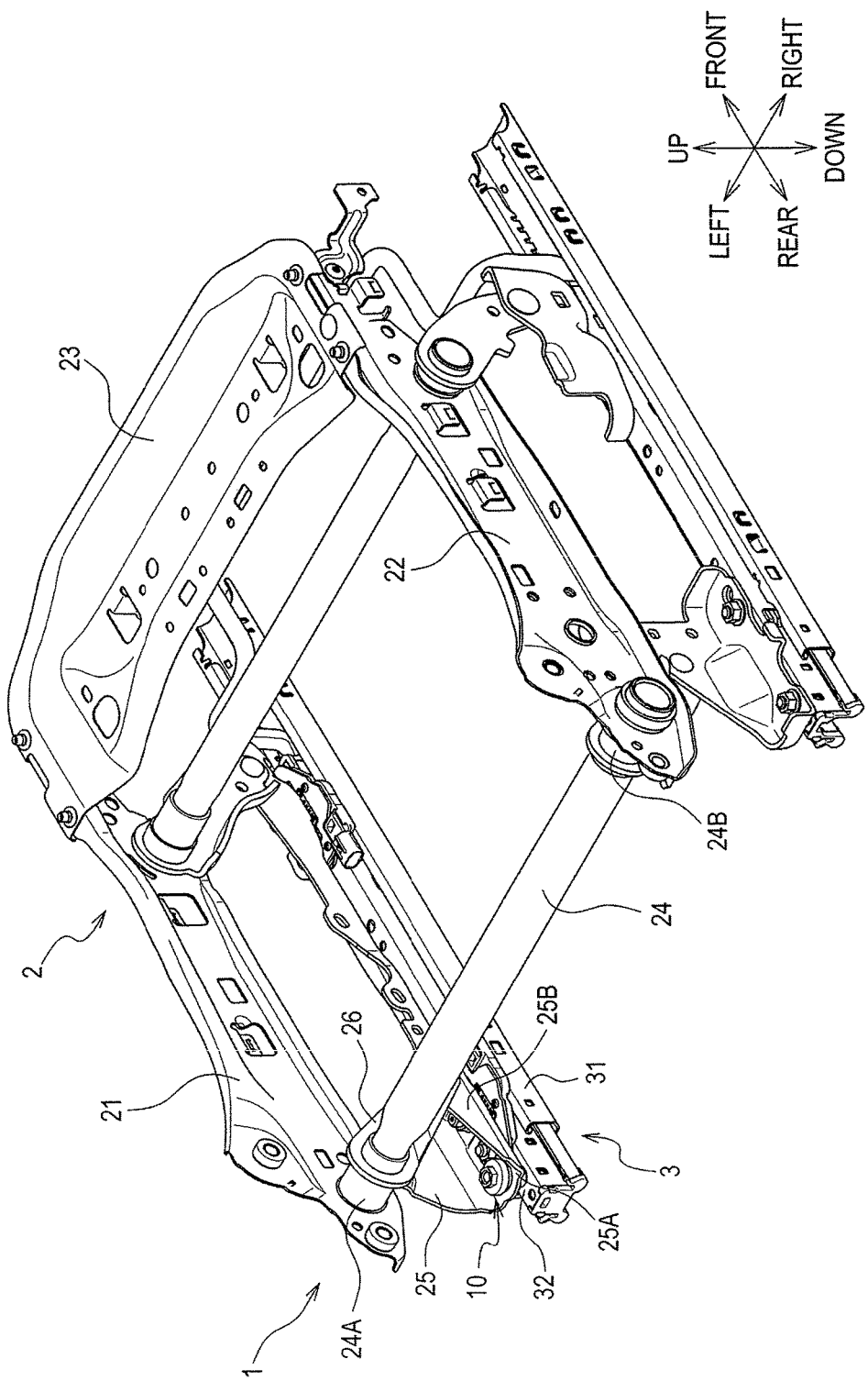
FIG. 1 is a schematic perspective view of a vehicle seat fastening structure in the embodiment as viewed from the rear of a cushion frame.

A vehicle seat fastening structure 1 shown in FIG. 1 fastens a cushion frame 2, forming a framework of a seat cushion of a vehicle seat, to a slide rail 3. The cushion frame 2 is fixed to the slide rail 3 in a vertically spaced-apart manner by a vehicle seat fastener 10 (hereinafter also simply referred to as the "fastener 10").

Although the cushion frame 2 is fixed to two slide rails arranged in a spaced-apart manner in a seat-width direction (a width direction), the vehicle seat fastening structure 1 of the present embodiment is used to fasten the slide rail 3 on the left side and the cushion frame 2.

The seat cushion, a seatback, and a headrest form the vehicle seat. The seatback supports the back of an occupant. The seat cushion supports the buttocks of the occupant. The headrest supports the head of the occupant.

The vehicle seat fastening structure 1 of the present embodiment is used to fasten a vehicle seat of a passenger car to its car body. Directions used in the description hereinafter and the drawings indicate respective directions in a state where the cushion frame 2 is assembled to the vehicle (that is, the passenger car). Also, in the present embodiment, the seat-width direction coincides with a right-left direction of the vehicle, and a seat front coincides with a vehicle front.

<Cushion Frame>

As shown in FIG. 1, the cushion frame 2 comprises two side frames 21 and 22, a front panel 23, a rear pipe 24, and a fixing bracket 25.

The two side frames 21 and 22 are panel-shaped members each extending in a seat front-rear direction and are arranged to be spaced apart from each other in the width direction. The front panel 23 is a panel-shaped member that extends in the width direction and couples respective front portions of the side frames 21 and 22. The rear pipe 24 is a pipe-shaped or wire-shaped member that extends in the width direction and couples respective rear portions of the side frames 21 and 22 through rear collars 24A, 24B, respectively.

Figure 2:
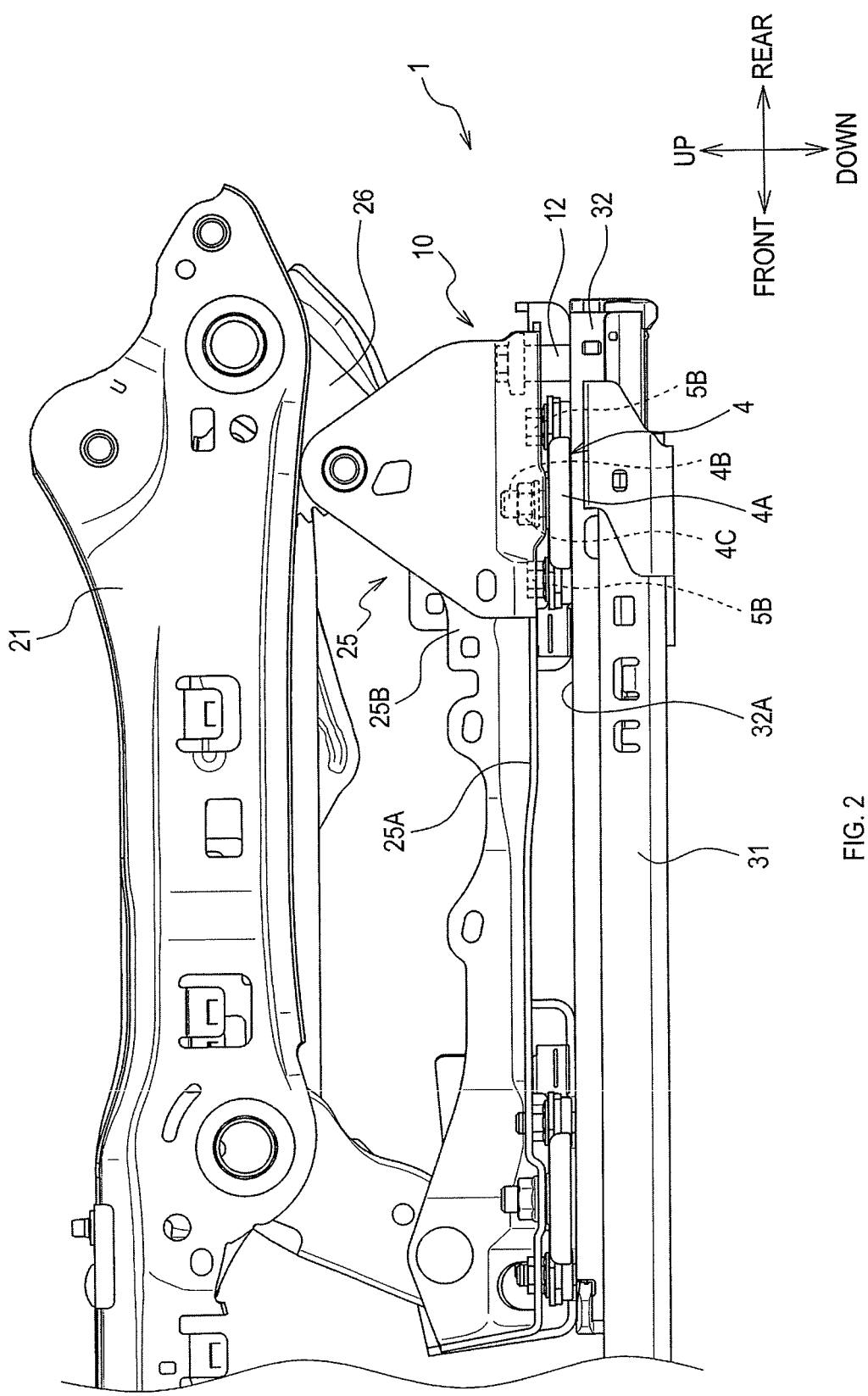
FIG. 2 is a schematic side view of the vehicle seat fastening structure of FIG. 1 as viewed from the left.
Figure 3:
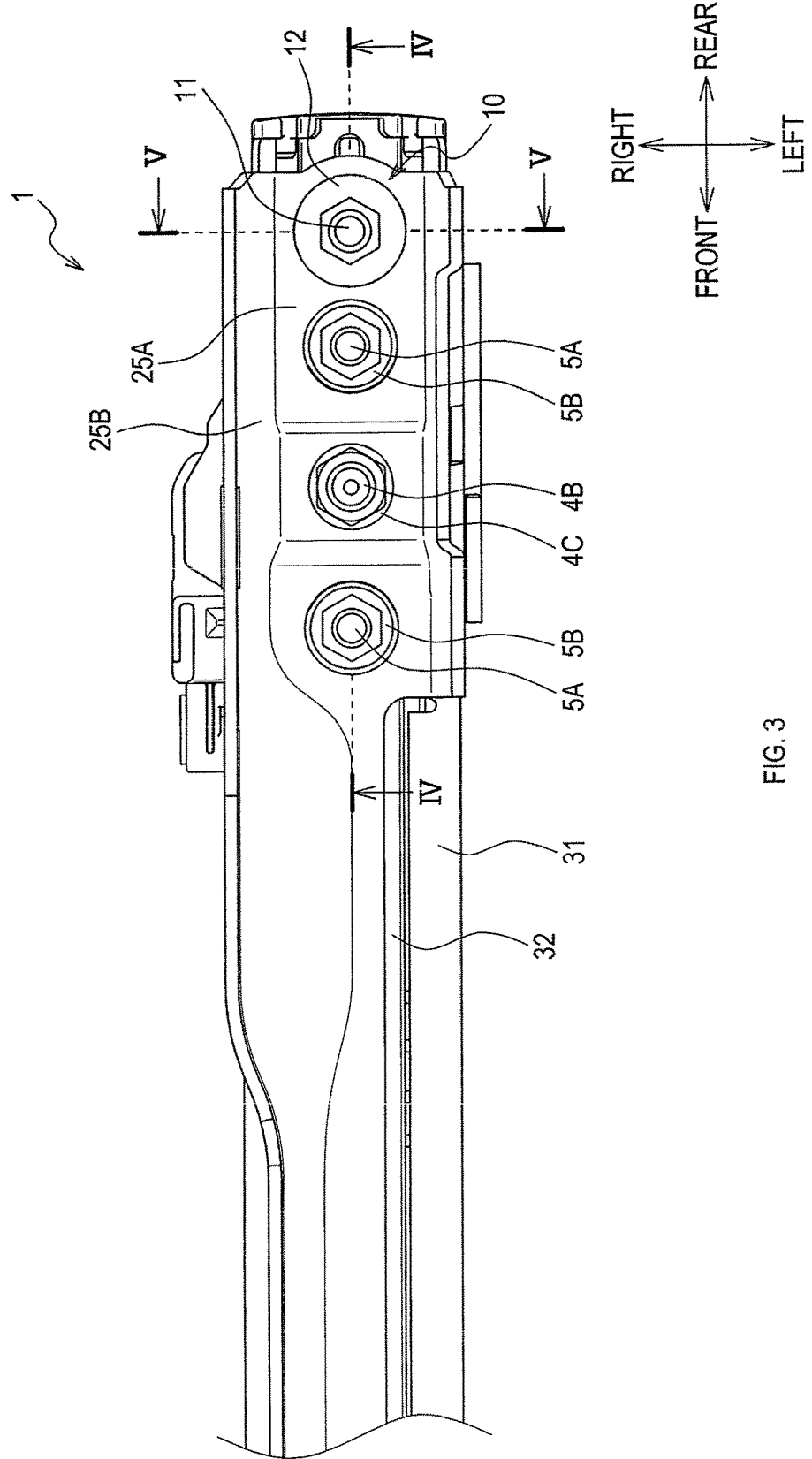
FIG. 3 is a schematic plan view of the vehicle seat fastening structure of FIG. 1 as viewed from above.

As shown in FIG. 1 and FIG. 2, the fixing bracket 25 is coupled to the rear pipe 24 through the rear collar 24A. A link 26 is coupled to a vicinity of the left end of the rear collar 24A in the width direction, that is, to a vicinity of the side frame 21 on the left side. As shown in FIGS. 2 and 3, the fixing bracket 25 comprises a bottom wall 25A extending in the width direction and the seat front-rear direction (that is, extending horizontally) and a side wall 25B extending vertically.

Figure 4:
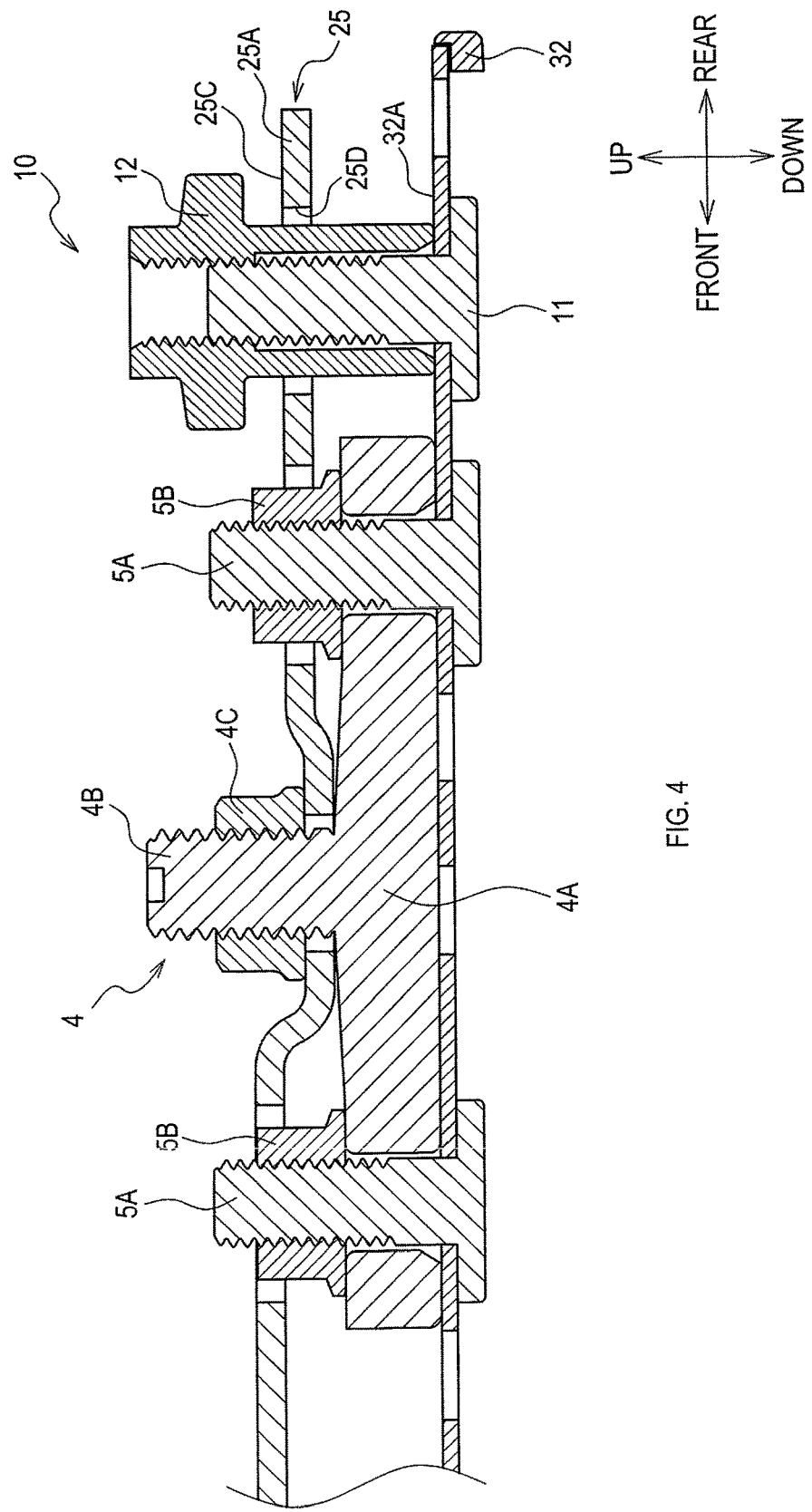
FIG. 4 is a schematic sectional view taken along a line IV-IV in FIG. 3.

The bottom wall 25A is fastened to a movable rail 32 of the slide rail 3 with the fastener 10. As shown in FIG. 4, the bottom wall 25A comprises a through hole 25D through which a body 12A of a nut 12 is inserted.

The side wall 25B is formed to continue from the bottom wall 25A and extend upward from the right end of the bottom wall 25A. As shown in FIG. 1, the link 26 is pivotably coupled to an upper end portion of the side wall 25B.

<Slide Rail>

The slide rail 3 comprises a mechanism to support the cushion frame 2 to be slidable in a vehicle front-rear direction.

As shown in FIG. 1, FIG. 2, and FIG. 3, the slide rail 3 comprises a fixed rail 31 and the movable rail 32.

The fixed rail 31 is fixed to a floor of the vehicle.

The movable rail 32 is arranged vertically above the fixed rail 31. Also, the movable rail 32 is configured to be slidable relative to the fixed rail 31. The movable rail 32 is fastened to the fixing bracket 25 of the cushion frame 2 with the fastener 10.

As shown in FIG. 2 and FIG. 4, the movable rail 32 is fastened to the bottom wall 25A of the fixing bracket 25 with the fastener 10 in a vertically spaced-apart manner. In other words, after fastening with the fastener 10, a space is formed between the upper surface 32A of the movable rail 32 and a lower surface of the bottom wall 25A. A load sensor 4 is arranged in this space.

<Load Sensor>

The load sensor 4 detects the weight of an occupant seated on a seat cushion configured with the cushion frame 2.

As shown in FIG. 4, the load sensor 4 comprises a sensor portion 4A, a bolt portion 4B, and a nut portion 4C. The sensor portion 4A is mounted on the upper surface 32A in a rear part of the movable rail 32. The sensor portion 4A detects a vertical load applied to the cushion frame 2 through the fixing bracket 25.

The bolt portion 4B projects vertically upward from the sensor portion 4A and penetrates the bottom wall 25A. As shown in FIG. 4, the bolt portion 4B is screw-engaged with the nut portion 4C arranged on the bottom wall 25A, thereby fixing the sensor portion 4A to the fixing bracket 25.

As shown in FIG. 3 and FIG. 4, the sensor portion 4A is fastened to the movable rail 32 and the fixing bracket 25 by bolts 5A each penetrating the movable rail 32, the sensor portion 4A, and the bottom wall 25A of the fixing bracket 25, and by nuts 5B screw-engaged with the respective bolts 5A. In the present embodiment, two sets of the bolts 5A and the nuts 5B are arranged such that the bolt portion 4B and the nut portion 4C of the load sensor 4 are located between the two sets in the seat front-rear direction.

<Fastener>

Figure 5:
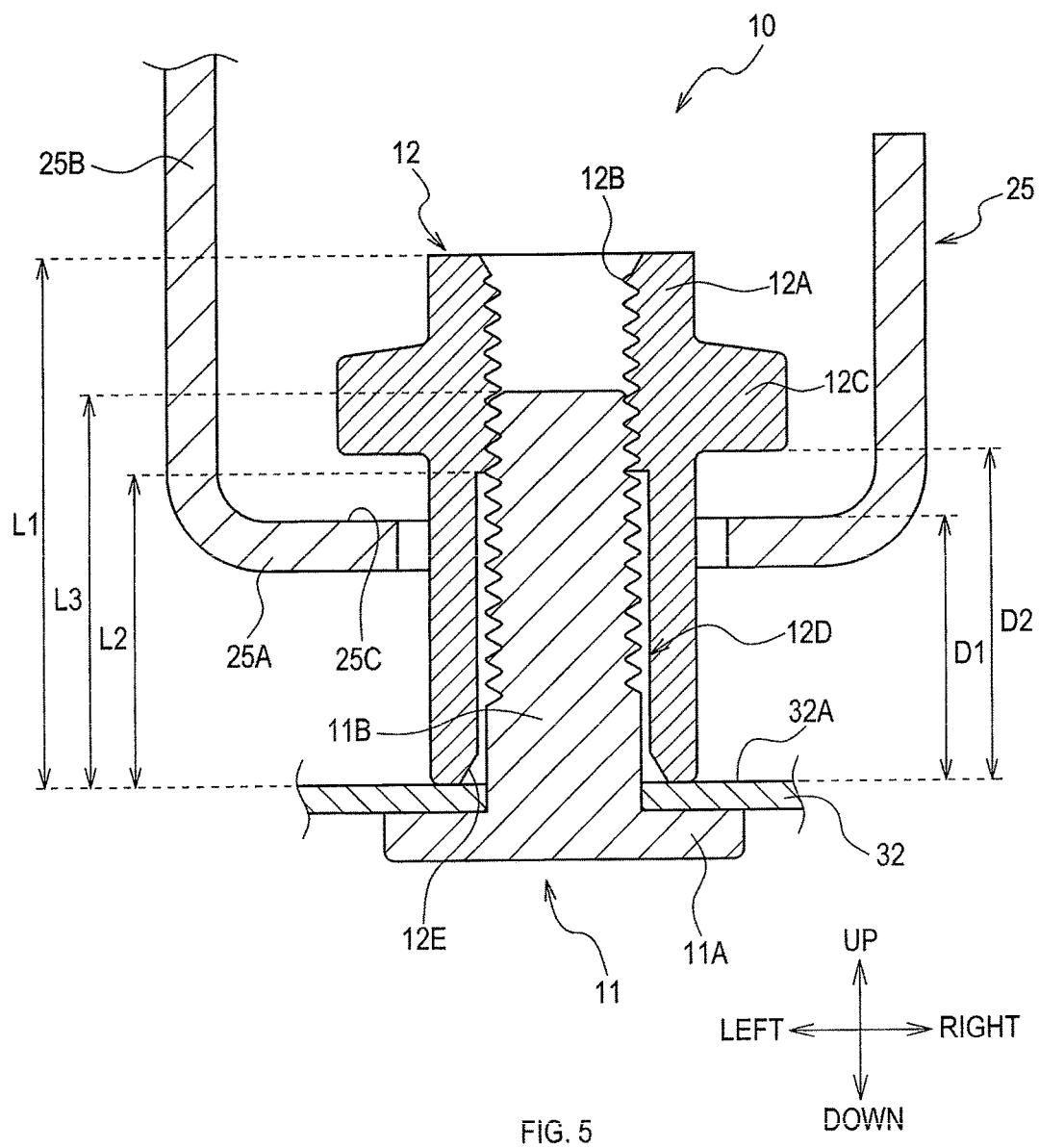
FIG. 5 is a schematic sectional view taken along a line V-V of FIG. 3.

The fastener 10 in the present embodiment fastens the cushion frame 2, which forms the framework of the seat cushion of the vehicle seat, to the slide rail 3 in a vertically spaced-apart manner. As shown in FIG. 5, the fastener 10 comprises a bolt 11 and a nut 12.

<<Bolt>>

The bolt 11 comprises a head portion 11A and a screw portion 11B. The head portion 11A is located under the movable rail 32. The screw portion 11B penetrates the movable rail 32 and the bottom wall 25A of the fixing bracket 25 from below.

In the present embodiment, a bolt that is the same as the bolt 5A to fasten the load sensor 4 is used for the bolt 11 of the fastener 10. This enhances the work efficiency in mounting the cushion frame 2.

<<Nut>>

The nut 12 comprises a body 12A having a cylindrical shape, a thread groove 12B, and a flange portion 12C. The body 12A penetrates the bottom wall 25A. Also, when the nut 12 is in a fastened state, a lower end of the nut 12 abuts the upper surface 32A of the movable rail 32.

The thread groove 12B is formed in an inner surface of the body 12A. The thread groove 12B is configured to allow screw-engagement with the bolt 11. The flange portion 12C is a flange-shaped portion that projects radially from the body 12A.

The nut 12 has a length L1 along its central axis that is greater than a separation distance D1 between the upper surface 32A of the movable rail 32 and the upper surface 25C of the bottom wall 25A of the fixing bracket 25 in a state in which no impact is applied to the cushion frame 2 as shown in FIG. 5.

The flange portion 12C is provided in an area of the nut 12 at a distance from an insertion opening for the bolt 11 in the nut 12 (that is, the lower end of the nut 12) greater than the separation distance D1. In other words, a separation distance D2 between a lower end of the flange portion 12C and the upper surface 32A of the movable rail 32 is greater than the separation distance D1.

Accordingly, the flange portion 12C is spaced apart from the bottom wall 25A of the fixing bracket 25 in a state where the cushion frame 2 is fastened to the slide rail 3 with the fastener 10, and no impact is applied to the cushion frame 2 (that is, a state where the cushion frame 2 is not raised).

The flange portion 12C comprises a flat lower surface and an inclined upper surface. A planar shape of the flange portion 12C (that is, a shape viewed in the central axis direction) is circular as shown in FIG. 3. A planar shape of a part of the body 12A above the flange portion 12C is hexagonal. However, the planar shape of the part may be other than hexagonal on condition that the nut 12 can be rotated with a tool.

As shown in FIG. 5, the thread groove 12B is formed only partially along the central axis of the nut 12 in the present embodiment. In other words, the body 12A comprises a non-threaded portion 12D having an inner surface without the thread groove 12B.

The non-threaded portion 12D is provided in an area starting from the lower end of the body 12A and ending below the flange portion 12C. The non-threaded portion 12D has a length L2 along the central axis that is greater than the separation distance D1 and less than the separation distance D2.

The thread groove 12B starts from below the flange portion 12C and ends at an upper end of the body 12A. Accordingly, at least a part of the thread groove 12B is located closer to the insertion opening for the bolt 11 than the flange portion 12C.

The non-threaded portion 12D provides a clearance from the bolt 11 when the bolt 11 is inserted. That is, in the non-threaded portion 12D, the body 12A of the nut 12 and the screw portion 11B of the bolt 11 are spaced apart. The lower end of the non-threaded portion 12D, that is, the insertion opening for the bolt 11 in the nut 12 comprises a taper portion 12E.

In the present embodiment, a length L3 of the bolt 11 from the upper surface 32A of the movable rail 32 to a top end of the screw portion 11B of the bolt 11 is greater than the separation distance D2 and less than the length L1 along the central axis of the nut 12 in the fastened state shown in FIG. 5. In other words, the screw portion 11B does not reach an upper end of the nut 12, and an upper part of the thread groove 12B is not screw-engaged with the screw portion 11B.

[1-2. Effects]

The first embodiment detailed above can achieve the following effects:

(1a) The length L1 along the central axis of the nut 12 that fastens the movable rail 32 and the bottom wall 25A of the fixing bracket 25 is greater than the separation distance D1 between the upper surface 32A of the movable rail 32 and the upper surface 25C of the bottom wall 25A. Also, the nut 12 comprises the flange portion 12C that is spaced apart from the bottom wall 25A of the fixing bracket 25 in the fastened state and also in the state in which no impact is applied to the cushion frame 2.

Figure 7:
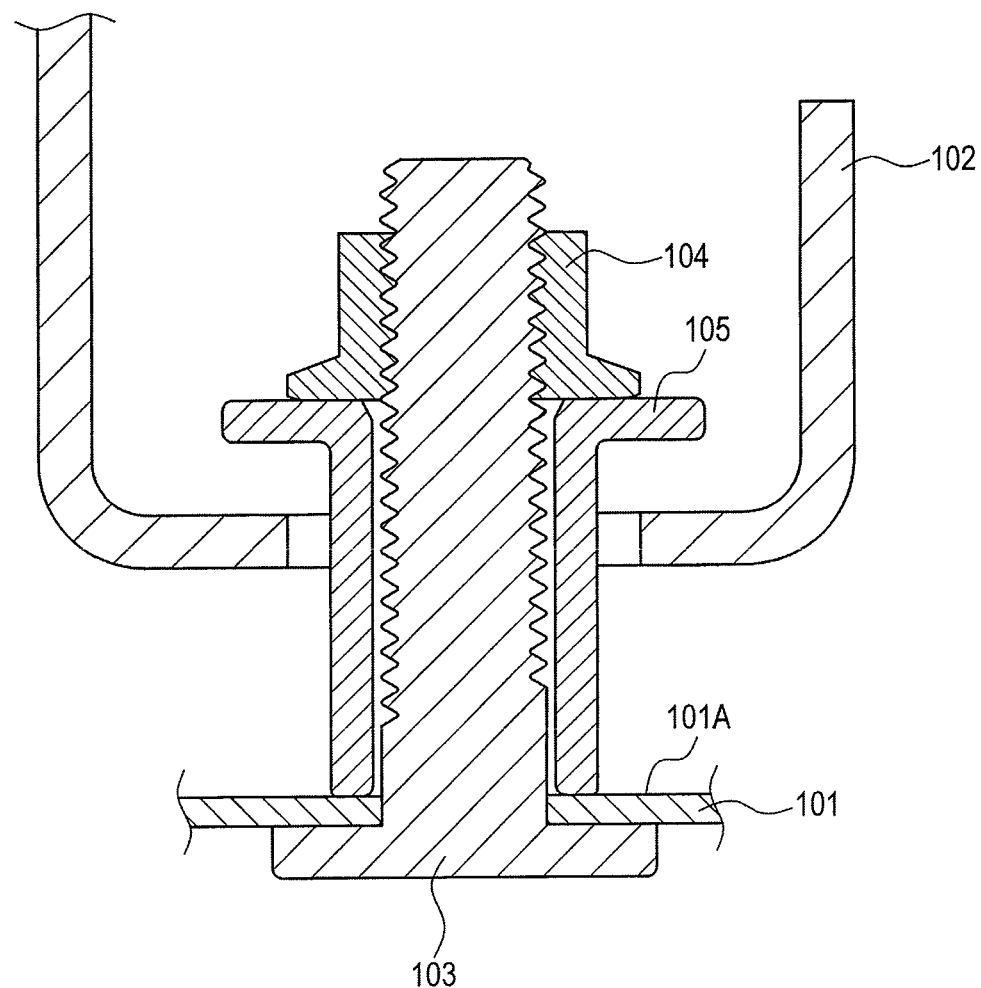
FIG. 7 is a schematic sectional view of a conventional fastener.

This enables fastening of the movable rail 32 and the cushion frame 2 in a spaced-apart manner using only the bolt 11 and the nut 12, without providing a spacer. Also, without the need to hold a spacer by the bolt 11 and the nut 12, a screw-engagement length of the bolt 11 and the nut 12 can be reduced. Accordingly, the bolt 11 may have a shorter length than that of a conventional bolt 103 shown in FIG. 7; thus, reduction in cost and weight of the fastener 10 can be achieved. Further, without the need of a spacer, the number of components for the fastener 10 is reduced, thereby achieving increased efficiency in manufacturing a vehicle seat.

(1b) The body 12A of the nut 12 comprises the non-threaded portion 12D having the inner surface without the thread groove 12B along the central axis; thus, the non-threaded portion 12D enables easy insertion of the bolt 11. Accordingly, increased work efficiency in fastening can be achieved.

(1c) At least a part of the thread groove 12B is located closer to the insertion opening for the bolt 11 than the flange portion 12C; thus, a part of the nut 12 opposite to the insertion opening for the bolt 11 relative to the flange portion 12C (that is, a part of the nut 12 above the flange portion 12C) may have a reduced length. Accordingly, further reduction in cost and weight of the fastener 10 can be achieved.

(1d) The non-threaded portion 12D provides a clearance from the bolt 11 when the bolt 11 is inserted; thus, easier insertion of the bolt 11 in the non-threaded portion 12D can be achieved. Accordingly, further increased work efficiency in fastening can be achieved.

2. Second Embodiment

[2-1. Configuration]

Figure 6:
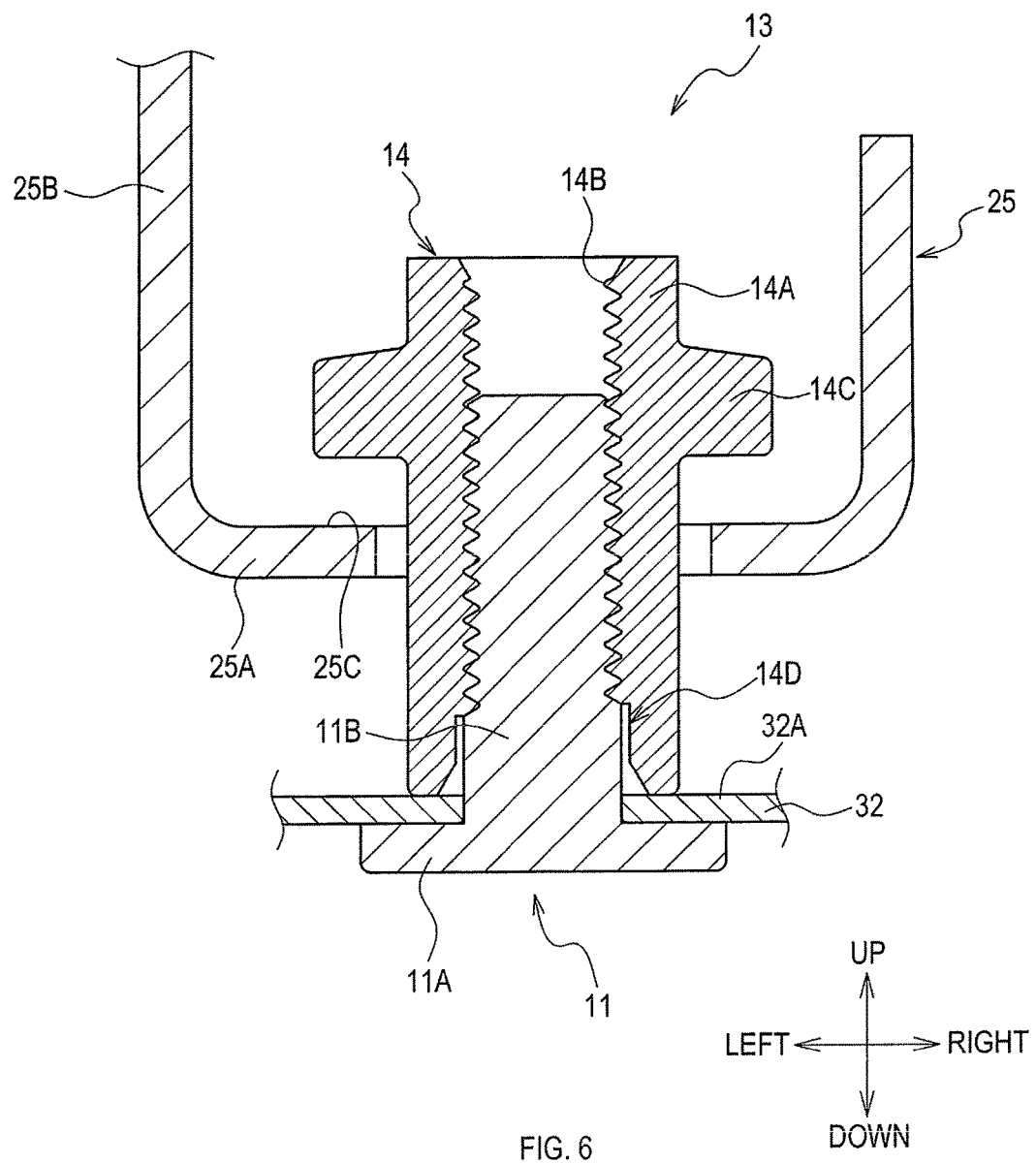
FIG. 6 is a schematic sectional view of a fastener in an embodiment different from that in FIG. 5.

According to a vehicle seat fastening structure of a second embodiment, the cushion frame 2 forming the framework of the seat cushion of the vehicle seat is fastened to the slide rail 3 with a fastener 13 shown in FIG. 6 in a similar manner as in the first embodiment.

The vehicle seat fastening structure of the second embodiment is the same as that in the first embodiment except for the fastener 13. Accordingly, the same configurations as in the first embodiment are assigned the same reference numerals as in the first embodiment, and no further description thereof will be provided.

<Fastener 13>

The fastener 13 comprises the bolt 11 and a nut 14. The bolt 11 is the same as the bolt 11 of the fastener 10 in the first embodiment.

The nut 14 comprises a body 14A, a thread groove 14B, and a flange portion 14C. The flange portion 14C is the same as the flange portion 12C of the first embodiment. Also, the body 14A is the same as the body 12A of the first embodiment except for comprising a non-threaded portion 14D having a length different from that of the non-threaded portion 12D.

The non-threaded portion 14D of the body 14A is provided only in an area below the flange portion 14C and not facing the screw portion 11B of the bolt 11 in a fastened state. In other words, in the present embodiment, the thread groove 14B is provided in a facing area that faces the screw portion 11B of the bolt 11 and an entire area above the facing area in the fastened state.

Thus, in an inner surface of the body 14A, the thread groove 14B is provided in an area greater than or equal to 80% of the length L1 along the central axis of the nut 14. The area in which the thread groove 14B is provided is preferably greater than or equal to 90% of the length L1 along the central axis of the nut 14.

[2-2. Effects]

The second embodiment detailed above can achieve the following effects:

(2a) Since the thread groove 14B is provided in the area greater than or equal to 80% of the length L1 along the central axis of the nut 14, a screw-engagement length between the bolt 11 and the nut 14 is increased, resulting in improved fastening strength. Also, this allows the bolt 11 to have an optional length.

3. Other Embodiments

Although some embodiments of the present disclosure have been described above, it is to be understood that the present disclosure is not limited to the above-described embodiments but may be in various forms.

(3a) In the vehicle seat fastening structure 1 and the fasteners 10 and 13 of the above-described embodiments, positions for forming the thread grooves 12B and 14B respectively in the nuts 12 and 14, that is, respective positions of the non-threaded portions 12D and 14D are merely examples. Accordingly, the thread groove 12B may be provided in the entire inner surface of the body 12A of the nut 12, and the thread groove 14B may be provided in the entire inner surface of the body 14A of the nut 14. In other words, the non-threaded portion 12D or 14D need not be provided.

Also, the thread groove 12B need not comprise a part located closer to the insertion opening for the bolt 11 than the flange portion 12C, and the thread groove 14B need not comprise a part located closer to the insertion opening for the bolt 11 than the flange portion 14C. Further, the non-threaded portion 12D or 14D need not always provide a clearance from the bolt 11 when the bolt 11 is inserted therein. Moreover, a plurality of the non-threaded portions 12D separate from one another along the central axis of the nut 12 may be provided in the inner surface of the body 12A, and a plurality of the non-threaded portions 14D separate from one another along the central axis of the nut 14 may be provided in the inner surface of the body 14A.

(3b) In the vehicle seat fastening structure 1 and the fasteners 10 and 13 of the above-described embodiments, the cushion frame 2 may be fastened to the movable rail 32 with the fastener 10 and 13, respectively, at a position other than the fixing bracket 25.

(3c) The vehicle seat fastening structure 1 and the fasteners 10 and 13 of the above-described embodiments may be applied to a seat for automobiles other than passenger cars, or a seat for use in any vehicles other than automobiles, such as railway vehicles, ships, and aircrafts.

(3d) It may be possible to divide a function performed by one element in the above-described embodiments to a plurality of elements, or to integrate functions of a plurality of elements into one element. Also, the configurations of the above-described embodiments may be partly omitted. Further, at least a part of a configuration in the above-described embodiments may be added to, or may replace, another configuration of the above-described embodiments. Any form that falls within the scope of the technical ideas defined by the language of the appended claims may be an embodiment of the present disclosure.

What is claimed is:

1. A vehicle seat fastening structure for fastening, with a bolt and a nut, a cushion frame that forms a framework of a seat cushion of a vehicle seat to a slide rail in a vertically spaced-apart manner,
    the slide rail comprising:
        a fixed rail fixed to a vehicle; and
        a movable rail arranged vertically above the fixed rail and slidable relative to the fixed rail,
    the cushion frame comprising:
        a bottom wall extending in a seat-width direction and in a seat front-rear direction,
    the nut comprising:
        a body having a cylindrical shape and configured to penetrate the bottom wall;
        a thread groove provided in an inner surface of the body and allowing screw-engagement with the bolt; and
        a flange portion projecting radially from the body,
    wherein a length of the nut along a central axis thereof is greater than a separation distance between an upper surface of the movable rail and an upper surface of the bottom wall of the cushion frame in a state in which no impact is applied to the cushion frame, and
    wherein the flange portion is provided in an area of the nut at a distance from an insertion opening for the bolt in the nut greater than the separation distance.

2. The vehicle seat fastening structure according to claim 1,
    wherein the body comprises a non-threaded portion without the thread groove in a part of the inner surface along the central axis of the nut.

3. The vehicle seat fastening structure according to claim 2,
wherein at least a part of the thread groove is positioned closer to the insertion opening for the bolt relative to the flange portion.

4. The vehicle seat fastening structure according to claim 2,
wherein the non-threaded portion is configured to provide a clearance from the bolt when the bolt is inserted in the nut.

5. The vehicle seat fastening structure according to claim 1,
wherein the thread groove is provided, in the inner surface of the body, in an area of greater than or equal to 80% of a length along the central axis of the nut.

6. A vehicle seat fastener comprising:
a bolt; and
a nut,
the bolt and the nut being configured to fasten a cushion frame that forms a framework of a seat cushion of a vehicle seat to a slide rail in a vertically spaced-apart manner,
the slide rail comprising:
a fixed rail fixed to a vehicle; and
a movable rail arranged vertically above the fixed rail and slidable relative to the fixed rail,
the cushion frame comprising:
a bottom wall extending in a seat-width direction and in a seat front-rear direction,
the nut comprising:
a body having a cylindrical shape and configured to penetrate the bottom wall;
a thread groove provided in an inner surface of the body and allowing screw-engagement with the bolt; and
a flange portion projecting radially from the body,
wherein a length of the nut along a central axis thereof is greater than a separation distance between an upper surface of the movable rail and an upper surface of the bottom wall of the cushion frame in a state in which no impact is applied to the cushion frame, and
wherein the flange portion is provided in an area of the nut at a distance from an insertion opening for the bolt in the nut greater than the separation distance.

* * * * *